(12) United States Patent
Huang et al.

(10) Patent No.: US 8,922,516 B2
(45) Date of Patent: Dec. 30, 2014

(54) TOUCH PANEL AND MULTI-POINTS DETECTING METHOD

(71) Applicant: Tianjin Funayuanchuang Technology Co., Ltd., Tianjin (CN)

(72) Inventors: Chun-Lung Huang, New Taipei (TW); Chien-Yung Cheng, New Taipei (TW); Po-Sheng Shih, New Taipei (TW)

(73) Assignee: Tianjin Funayuanchuang Technology Co., Ltd., Tianjin (CN)

( * ) Notice: Subject to any disclaimer, the term of this patent is extended or adjusted under 35 U.S.C. 154(b) by 108 days.

(21) Appl. No.: 13/851,742

(22) Filed: Mar. 27, 2013

(65) Prior Publication Data

US 2014/0292667 A1    Oct. 2, 2014

(51) Int. Cl.
 *G06F 3/041* (2006.01)

(52) U.S. Cl.
 CPC ....................................... *G06F 3/041* (2013.01)
 USPC ........... 345/173; 345/174; 345/179; 345/104; 178/18.01; 178/18.03; 178/18.09

(58) Field of Classification Search
 CPC ..................... G06F 2203/04808; G06F 3/0416; G06F 3/044; G06F 3/0488; G06F 3/04883
 USPC ............... 345/173, 174, 179, 104; 178/18.01, 178/18.03, 18.05, 18.06, 18.09
 See application file for complete search history.

(56) References Cited

U.S. PATENT DOCUMENTS

| | | | |
|---|---|---|---|
| 5,943,043 A * | 8/1999 | Furuhata et al. | 345/173 |
| 7,254,775 B2 * | 8/2007 | Geaghan et al. | 715/701 |
| 8,120,371 B2 * | 2/2012 | Day et al. | 324/661 |
| 8,248,383 B2 * | 8/2012 | Dews et al. | 345/173 |
| 8,373,670 B2 * | 2/2013 | Liu | 345/173 |
| 8,610,685 B2 * | 12/2013 | Chen et al. | 345/173 |
| 8,624,861 B2 * | 1/2014 | Yang et al. | 345/173 |
| 8,707,195 B2 * | 4/2014 | Fleizach et al. | 715/773 |
| 8,810,529 B2 * | 8/2014 | Van Eerd et al. | 345/173 |
| 2003/0063073 A1 * | 4/2003 | Geaghan et al. | 345/173 |
| 2005/0046621 A1 * | 3/2005 | Kaikuranta | 345/173 |
| 2009/0267914 A1 * | 10/2009 | Dews et al. | 345/173 |
| 2009/0322355 A1 * | 12/2009 | Day et al. | 324/691 |
| 2010/0259499 A1 * | 10/2010 | Kaikuranta et al. | 345/173 |
| 2011/0007007 A1 * | 1/2011 | Lin et al. | 345/173 |
| 2011/0012927 A1 * | 1/2011 | Lin et al. | 345/650 |
| 2011/0025628 A1 * | 2/2011 | Lin et al. | 345/173 |
| 2011/0037727 A1 * | 2/2011 | Lee et al. | 345/174 |
| 2011/0109563 A1 * | 5/2011 | Liu | 345/173 |
| 2011/0148804 A1 * | 6/2011 | Yeh et al. | 345/174 |

(Continued)

*Primary Examiner* — Lun-Yi Lao
*Assistant Examiner* — Peter D McLoone
(74) *Attorney, Agent, or Firm* — Novak Druce Connolly Bove + Quigg LLP

(57) ABSTRACT

A multi-points detecting method includes proving a touch panel including a plurality of detecting areas including a first detecting area, a second detecting area and a third detecting area. A maximum detecting value of a detecting curve is located in the first detecting area. The first detecting area and the second detecting area are analyzed to obtain a relative distance between a first touch point coordinate and a second touch point coordinate. The touch panel is defined as being touched at the first touch point coordinate or a middle point between the first touch point coordinate and the second touch point coordinate, when the relative distance is less than a predetermined distance. The touch panel is defined as being touched at the first touch point coordinate and the second touch point coordinate, when the relative distance is greater than or equal to the predetermined distance.

20 Claims, 10 Drawing Sheets

(56) References Cited

U.S. PATENT DOCUMENTS

| | | |
|---|---|---|
| 2011/0302519 A1* | 12/2011 | Fleizach et al. ............... 715/773 |
| 2012/0007816 A1* | 1/2012 | Lin et al. ........................ 345/173 |
| 2012/0056851 A1* | 3/2012 | Chen et al. .................... 345/174 |
| 2012/0062474 A1* | 3/2012 | Weishaupt et al. ........... 345/173 |
| 2012/0062512 A1* | 3/2012 | Cheng et al. .................. 345/174 |
| 2012/0092282 A1* | 4/2012 | Chen et al. .................... 345/173 |
| 2012/0206373 A1* | 8/2012 | Van Eerd et al. ............. 345/173 |
| 2012/0242595 A1* | 9/2012 | Yang et al. .................... 345/173 |
| 2013/0021263 A1* | 1/2013 | Tong et al. ..................... 345/173 |

\* cited by examiner

TOUCH PANEL AND MULTI-POINTS DETECTING METHOD

BACKGROUND

1. Technical Field

The present application relates to a touch panel and a multi-points detecting method of the touch panel.

2. Discussion of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Accuracy of single-point and multi-points detecting plays an important role in the process of development of touch panel.

What is needed, therefore, is to provide a touch panel and a multi-points detecting method of the touch panel to overcome the afore mentioned shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
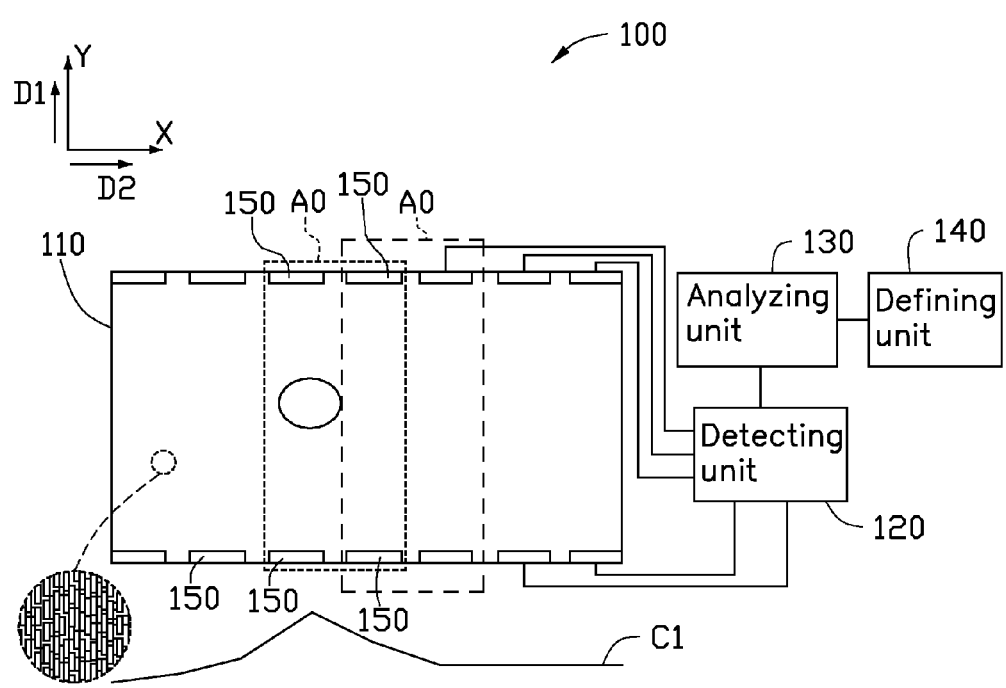
FIG. 1 is a schematic view of one embodiment of a touch panel.

FIG. 1 is a touch panel 100 of one embodiment. The touch panel 100 includes a plurality of detecting areas A0, a plurality of sensing units 110, a detecting unit 120, an analyzing unit 130, and a defining unit 140.

The plurality of sensing units 110 can be a stripe structure and can be located in the plurality of detecting areas A0. The plurality of sensing units 110 is parallel to each other and can be oriented along a first axial direction D1. The touch panel 100 further includes a plurality of electrodes 150. The plurality of electrodes 150 is located on opposite two ends of the plurality of sensing units 110 and electrically connected with the plurality of sensing units 110. Two adjacent electrodes 150, and their opposite two adjacent electrodes 150, define a detecting area A0, as shown in FIG. 1. Thus, two adjacent detecting areas A0 can share two electrodes 150 opposite to each other. Two adjacent detecting areas A0 can overlap in part. In each of the plurality of detecting areas A0, the plurality of sensing units 110 has lower impedance along the first axial direction D1 and has higher impedance along a second axial direction D2 perpendicular to the first axial direction D1. In one embodiment, the first axial direction D1 is Y axial direction, the second axial direction D2 is X axial direction. The plurality of sensing units 110 can be a plurality of carbon nanotubes. In one embodiment, the plurality of sensing units 110 is the plurality of carbon nanotubes.

FIG. 1 shows that a detecting curve C1 can be formed by detecting the touch panel 100 with the detecting unit 120 along the second axial direction D2. One touched detecting area A0 can be detected by a peak value of the detecting curve C1. Then, in the touched detecting area A0, a coordinate of X axial direction of a touch point can be obtained by detecting capacitance values of four electrodes 150 with the detecting unit 120, wherein the four electrodes 150 form the touched detecting area A0.

The analyzing unit 130 includes a plurality of analyzing programs, such as, program for analyzing a coordinate value. The defining unit 140 can export or record various analysis results of touching the touch panel 100. The analyzing unit 130 and the defining unit 140 can be a wafer, a circuit or a storage media for storing array program.

Figure 2:
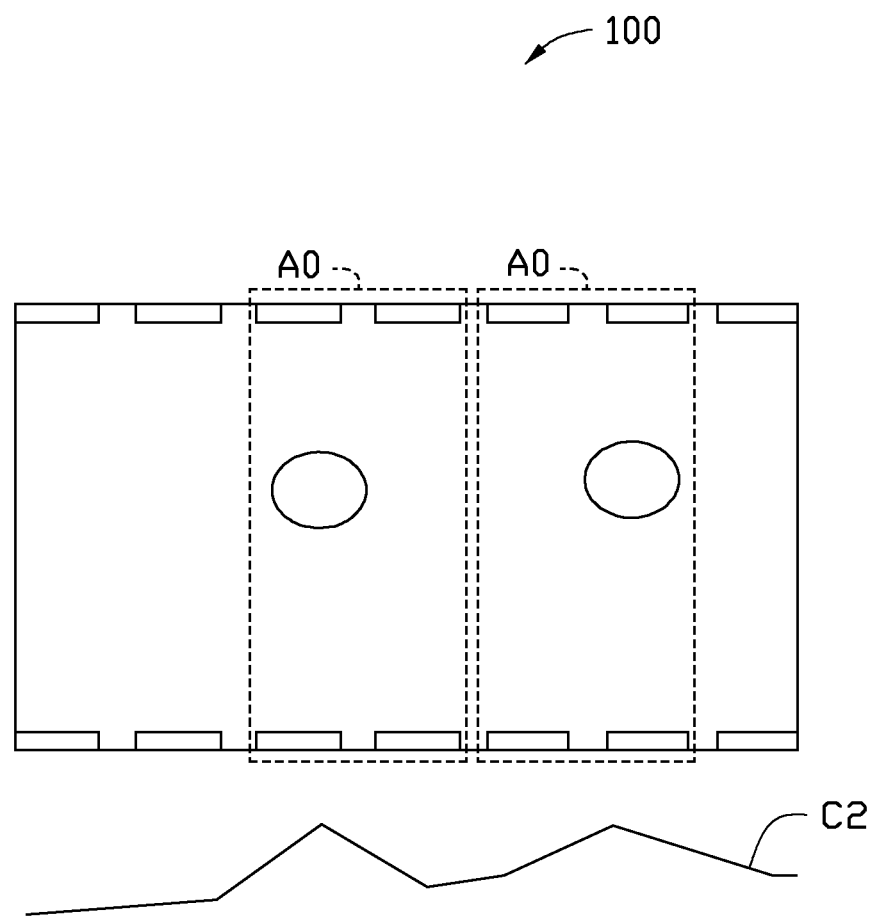
FIG. 2 is a schematic view of one embodiment of touching the touch panel with two fingers.

FIG. 2 shows that when the touch panel 100 is touched by two fingers, to obtain two touch points located in two separated detecting areas A0. The two separated detecting areas A0 can be detected by two peak values of a detecting curve C2. Then, in the two separated detecting areas A0, coordinates of X axial direction of the two touch points can be obtained by the detecting unit 120.

Figure 3:
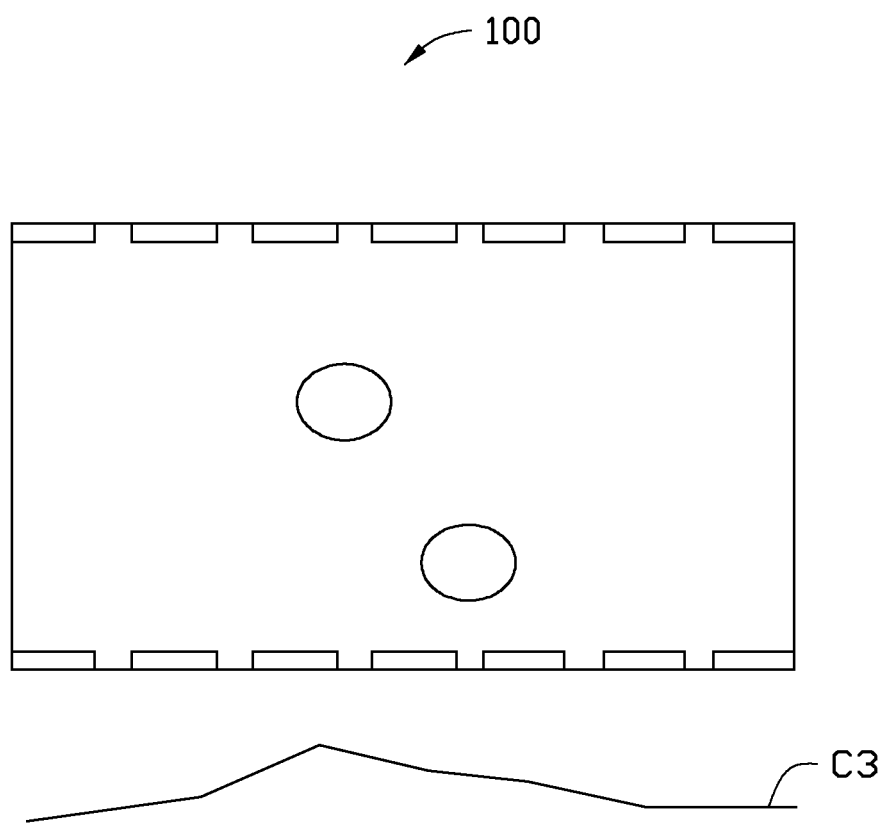
FIG. 3 is another schematic view of one embodiment of touching the touch panel with two fingers.
Figure 4:
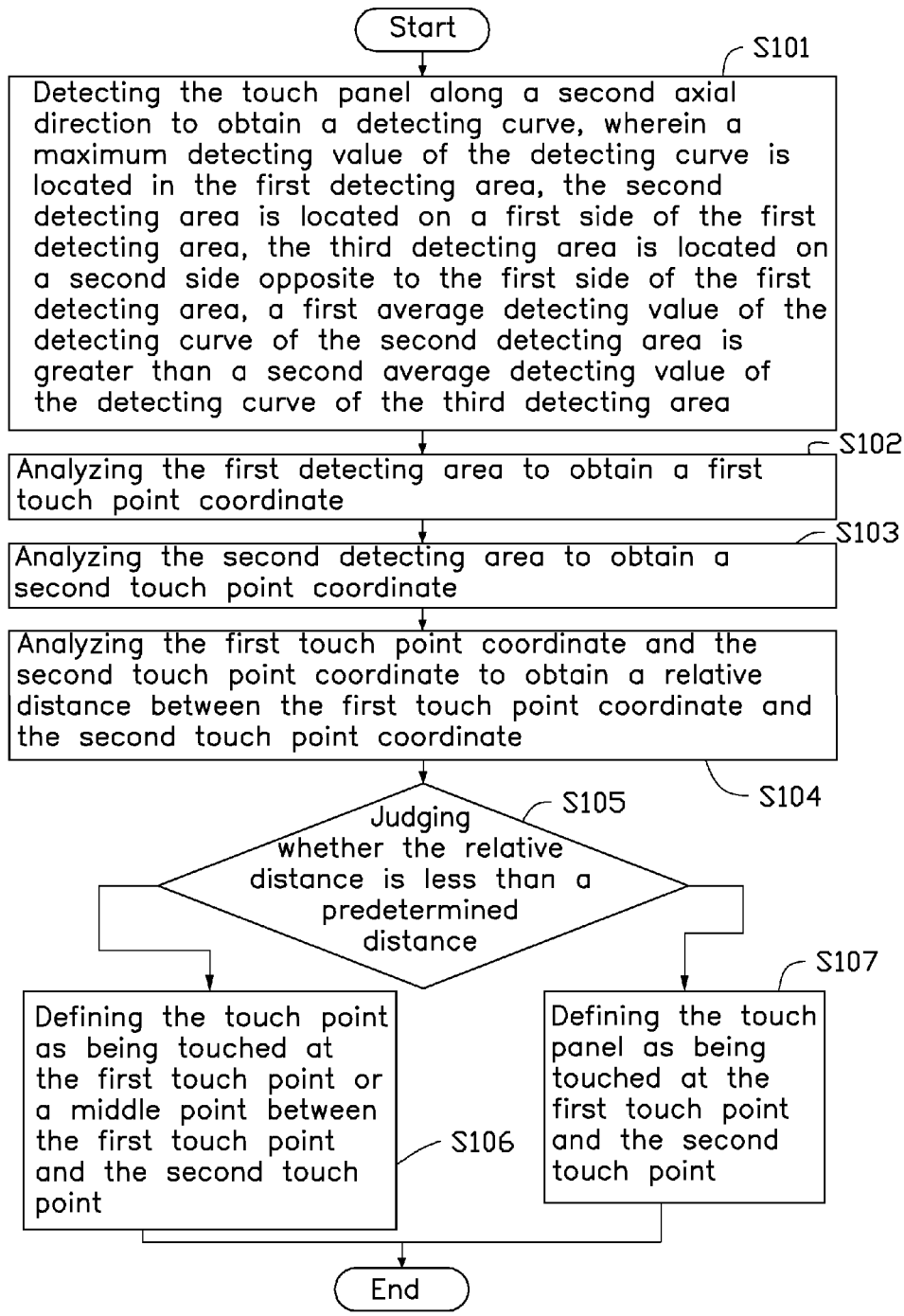
FIG. 4 is a flowchart of one embodiment of multi-points detecting method of the touch panel.

FIG. 3 shows that when the touch panel 100 is touched by two fingers, to obtain two points located in two detecting areas A0 are overlapped in part, and the two touch points are partially located in the overlapped detecting area A0. There are not two clear peak values in a detecting curve C3. The touch panel 100 can be analyzed and detected by a multi-points detecting method.

FIGS. 4 and 5A-5D show that the multi-points detecting method includes steps of:

(S101), detecting the touch panel 100 with the detecting unit 120 along the second axial direction D2 to obtain a detecting curve C4, a maximum detecting value Vmax of the detecting curve C4 is located in a first detecting area A1, a second detecting area A2 is located on a first side of the first detecting area A1, and a third detecting area A3 is located on a second side opposite to the first side of the first detecting area A1, wherein a first average detecting value of the detecting curve C4 of the second detecting area A2 is greater than a second average detecting value of the detecting curve C4 of the third detecting area A3;

(S102), analyzing the first detecting area A1 by the analyzing unit 130 to obtain a first touch point coordinate P1;

(S103), analyzing the second detecting area A2 by the analyzing unit 130 to obtain a second touch point coordinate P2;

(S104), analyzing the first touch point coordinate P1 and the second touch point coordinate P2 to obtain a relative distance D12 by the analyzing unit 130, wherein the relative distance D12 is between the first touch point coordinate P1 and the second touch point coordinate P2;

(S105), judging whether the relative distance D12 is less than a predetermined distance by the analyzing unit 130, if the relative distance D12 is less than the predetermined distance, go to (S106); if the relative distance D12 is greater than or equal to the predetermined distance, go to (S107);

(S106), defining the touch panel 100 as being touched at the first touch point coordinate P1 or a middle point M between the first touch point coordinate P1 and the second touch point coordinate P2 by the defining unit 140; and (S107), defining the touch panel 100 as being simultaneously touched at the first touch point coordinate P1 and the second touch point coordinate P2 by the defining unit 140.

Figure 5A:
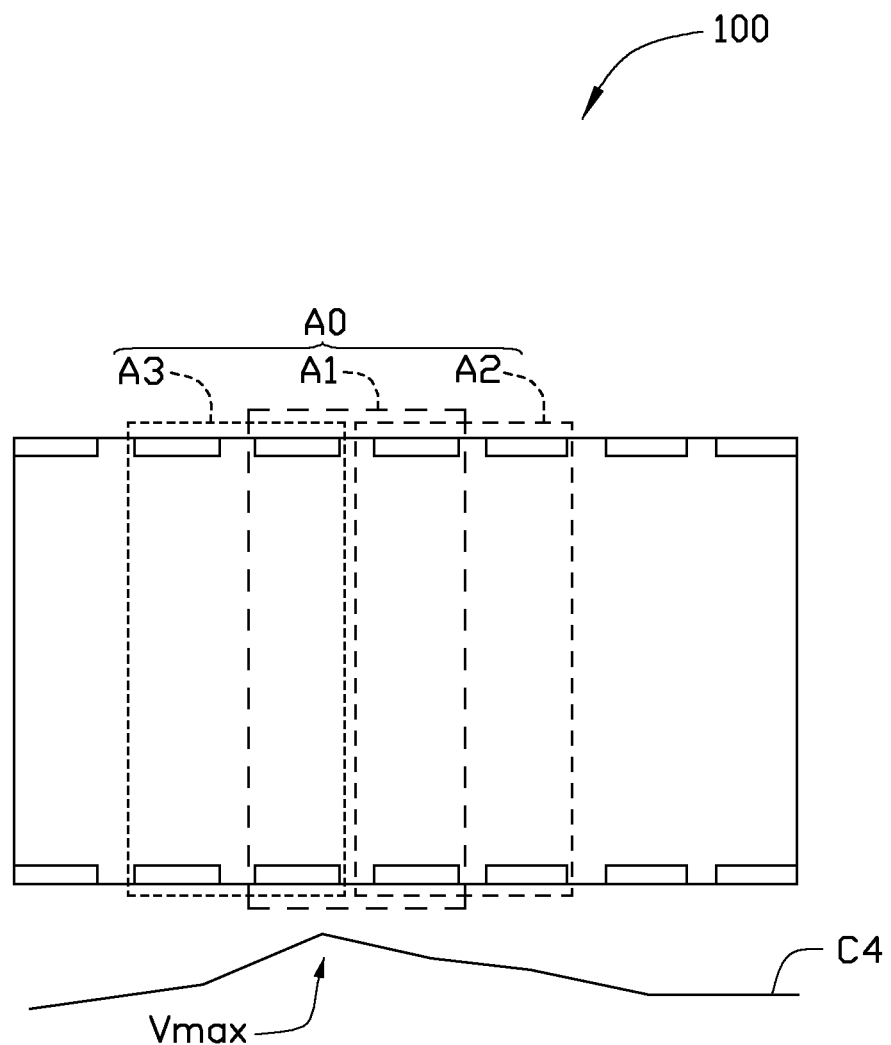
FIGS. 5A-5D are schematic views of each step of the multi-points detecting method of FIG. 4.
Figure 5B:
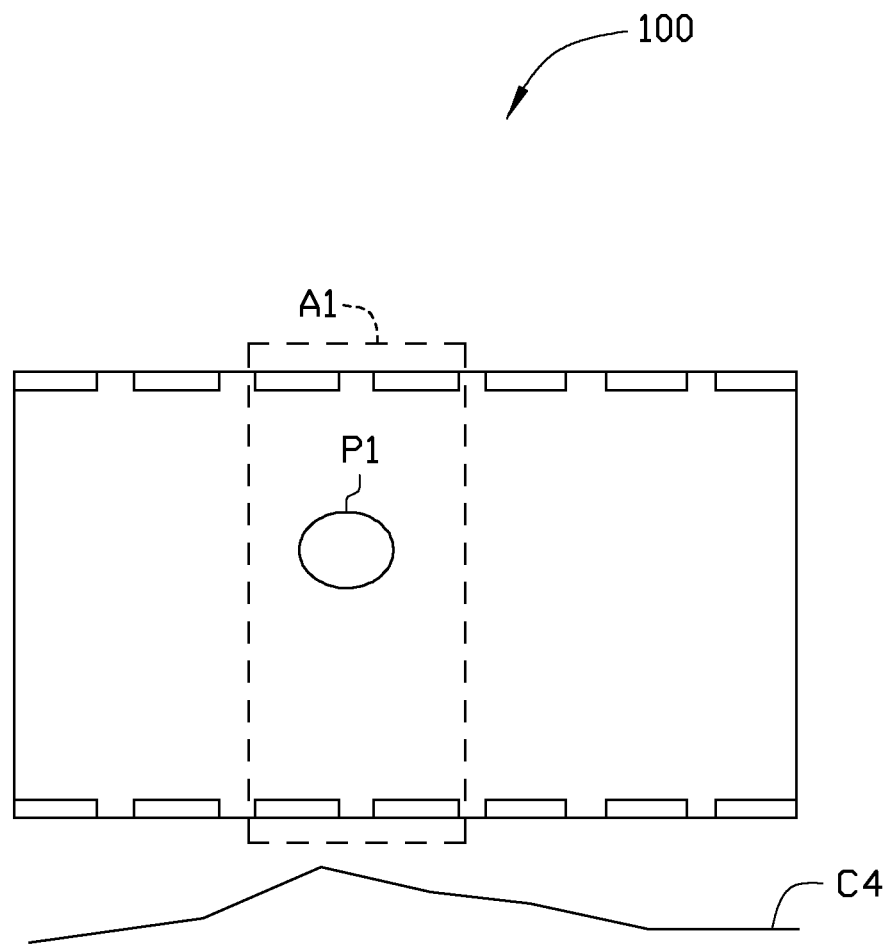
Figure 5C:
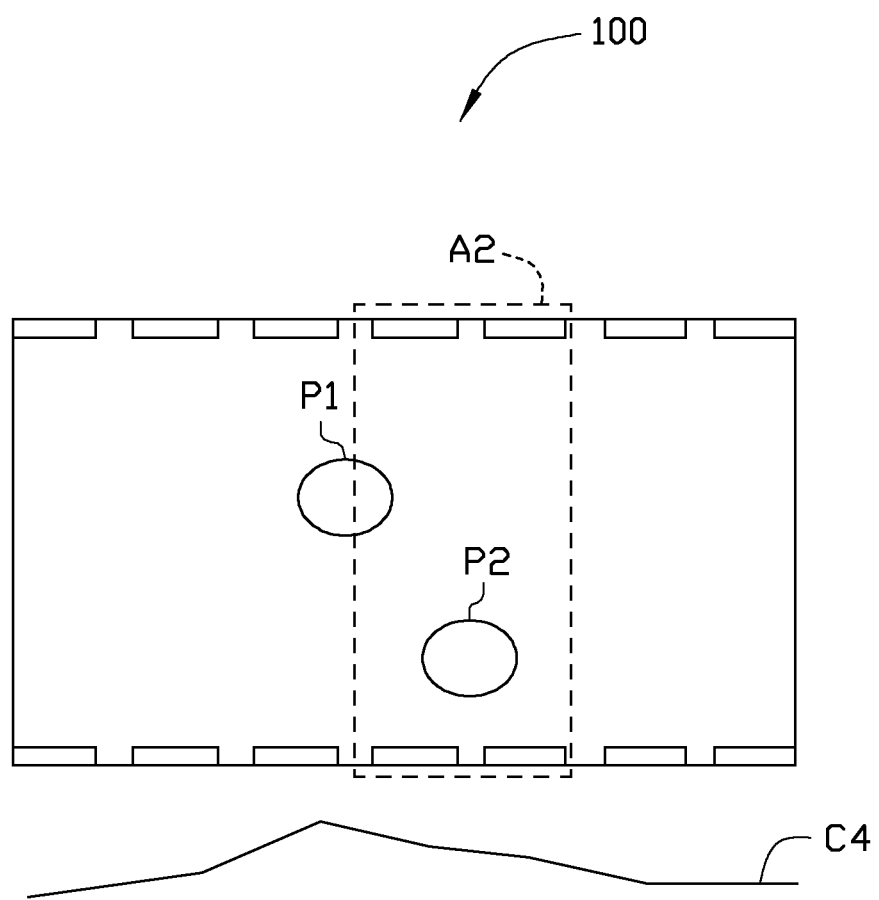
Figure 5D:
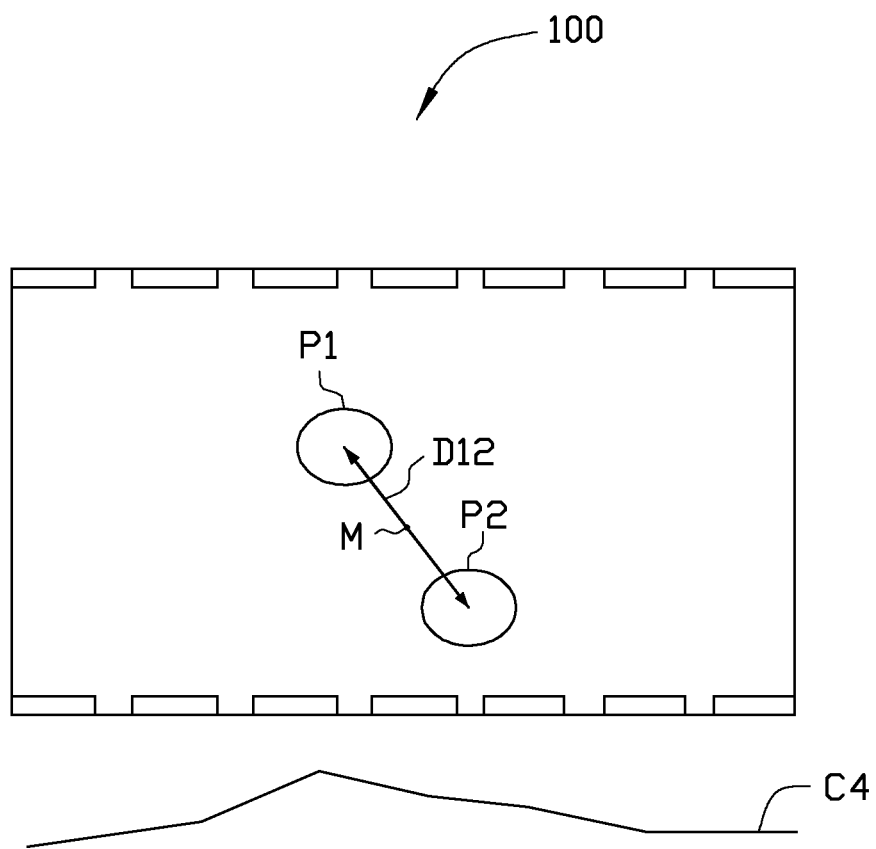

In the step (S101), referring to FIG. 5A, the second detecting area A2 and the first detecting area A1 can overlap in part. The third detecting area A3 and the first detecting area A1 can overlap in part.

When the maximum detecting value Vmax of the detecting curve C4 is located in the first detecting area A1, the first detecting area A1 of the touch panel 100 must be touched by one finger. When the first average detecting value of the detecting curve C4 of the second detecting area A2 is greater than the second average detecting value of the detecting curve C4 of the third detecting area A3, the second detecting area A2 may be touched by another finger or may be touched by a thick finger. The thick finger simultaneously touched the first detecting area A1 and the second detecting area A2.

In the steps (S102) and (S103), the first touch point coordinate P1 and the second touch point coordinate P2 are two-dimensional coordinates.

In the step (S105), the predetermined distance can be in a range from about 0.5 centimetres to about 1.5 centimetres. The predetermined distance can be adjusted according to need. The predetermined distance can be adjusted according to size of finger.

In the step (S106), the first touch point coordinate P1 is very close to the second touch point coordinate P2. A distance between the first touch point coordinate P1 and the second touch point coordinate P2 is very short. Thus, the touch panel 100 is touched by only one finger.

In the step (S107), the first touch point coordinate P1 is from away the second touch point coordinate P2. The distance between the first touch point coordinate P1 and the second touch point coordinate P2 is very long. Thus, two fingers touch the touch panel 100.

According to above multi-points detecting method, whether the touch panel 100 is touched by many fingers can be judged. When the touch panel 100 is touched by two fingers close to each other, two touch point coordinates of the touch panel 100 can be exactly obtained. When the touch panel 100 is touched by one thick finger, the touch panel 100 cannot be considered touched by two fingers.

Figure 6:
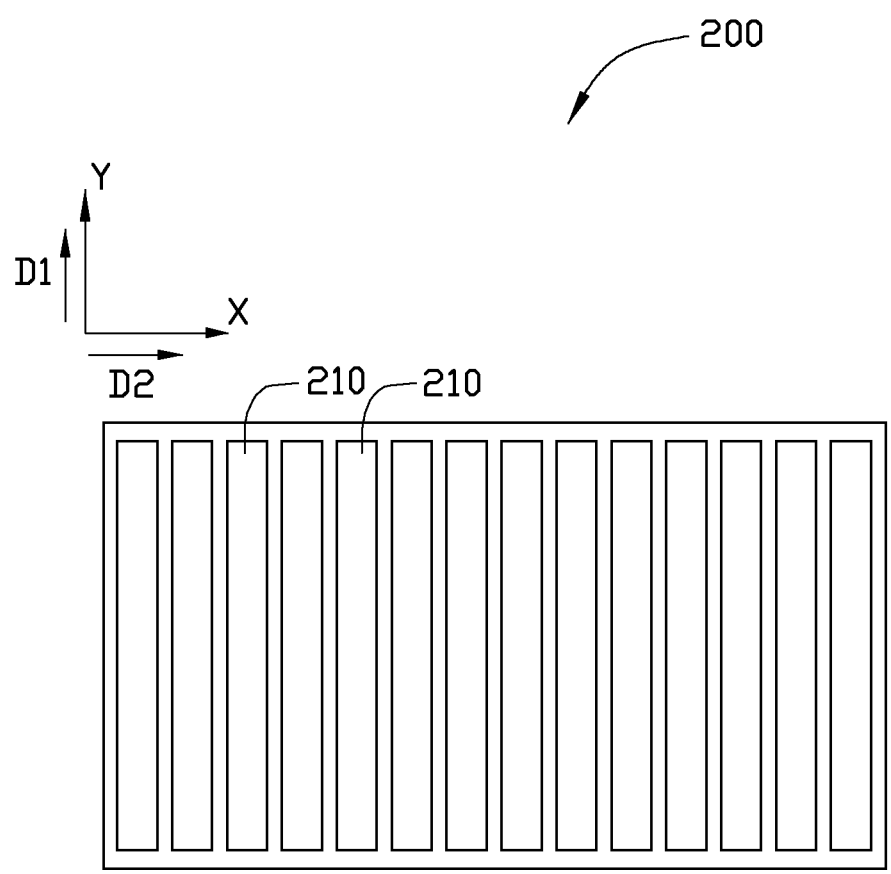
FIG. 6 is a schematic view of another embodiment of a touch panel.

FIG. 6 shows an embodiment of a touch panel 200 where a plurality of sensing units 210 is a plurality of stripe metal films. The plurality of stripe metal films can be oriented along a first axial direction D1. The plurality of stripe metal films has lower impedance along the first axial direction D1, and has higher impedance along a second axial direction D2 perpendicular to the first axial direction D1.

Figure 7:
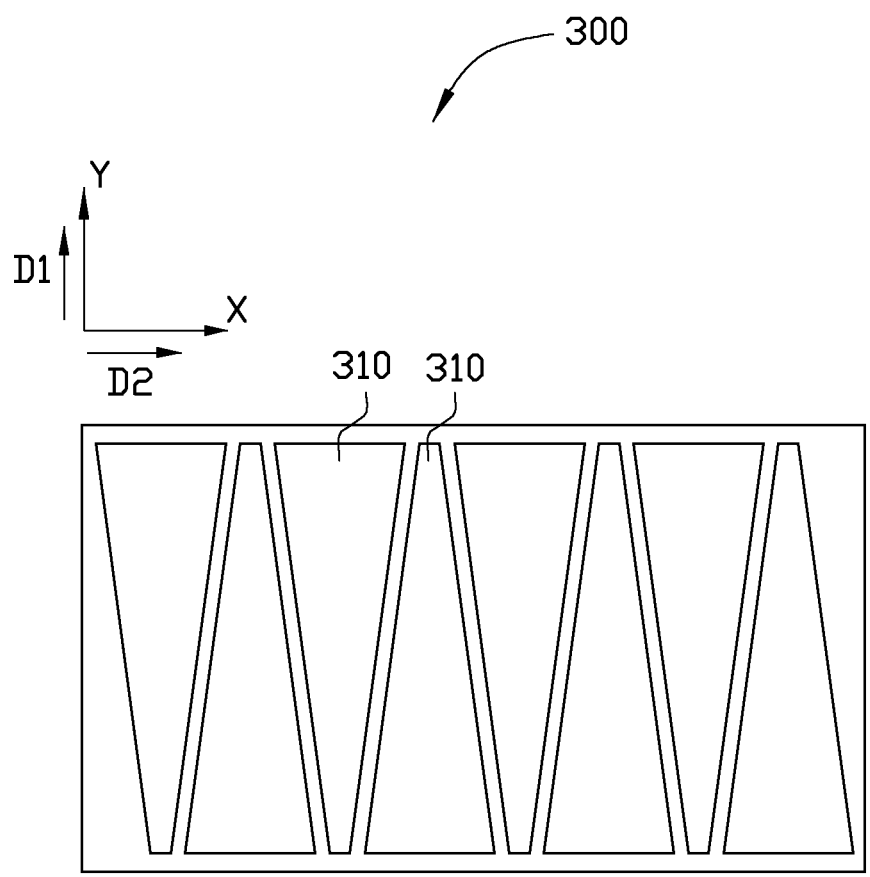
FIG. 7 is a schematic view of yet another embodiment of a touch panel.

FIG. 7 shows an embodiment of a touch panel 300 where a plurality of sensing units 310 is a plurality of stripe indium tin oxides (ITOs) or a plurality of indium zinc oxides (IZOs). The plurality of stripe ITOs or the plurality of stripe IZOs can be oriented along a first axial direction D1. The plurality of stripe ITOs or the plurality of stripe IZOs has lower impedance along the first axial direction D1, and has higher impedance along a second axial direction D2 perpendicular to the first axial direction D1. The shape of the plurality of stripe ITOs or the plurality of stripe IZOs can be selected according to need. In one embodiment, the shape of the plurality of stripe ITOs or the plurality of stripe IZOs is trapezoid shape.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A touch panel, comprising:
    a plurality of detecting areas comprising a first detecting area, a second detecting area, and a third detecting area; wherein the second detecting area is located on a first side of the first detecting area, and the third detecting area is located on a second side, opposite to the first side of the first detecting area;
    a plurality of sensing units located in the plurality of detecting areas and oriented along a first axial direction;
    a detecting unit capable of detecting the touch panel along a second axial direction to obtain a detecting curve, wherein a maximum detecting value of the detecting curve is located in the first detecting area, a first average detecting value of the detecting curve of the second detecting area is greater than a second average detecting value of the detecting curve of the third detecting area;
    an analyzing unit capable of analyzing the first detecting area to obtain a first touch point coordinate, analyzing the second detecting area to obtain a second touch point coordinate, and analyzing a relative distance between the first touch point coordinate and the second touch point coordinate; and
    a defining unit capable of defining the touch panel as being touched at the first touch point coordinate or a middle point between the first touch point coordinate and the second touch point coordinate, when the relative distance is less than a predetermined distance; and the defining unit capable of defining the touch panel as being touched at the first touch point coordinate and the second touch point coordinate, when the relative distance is greater than or equal to the predetermined distance.

2. The touch panel of claim 1, wherein the plurality of sensing units is a plurality of carbon nanotubes, a plurality of stripe metal films, a plurality of stripe indium tin oxides or a plurality of indium zinc oxides.

3. The touch panel of claim 1, wherein each of the plurality of sensing units has lower impedance along the first axial direction, and has higher impedance along the second axial direction that is perpendicular to the first axial direction.

4. The touch panel of claim 1, wherein two adjacent detecting areas overlap in part.

5. The touch panel of claim 1, wherein the predetermined distance is in a range from about 0.5 centimetres to about 1.5 centimetres.

6. The touch panel of claim 1, wherein the first touch point coordinate and the second touch point coordinate are two-dimensional coordinates.

7. The touch panel of claim 1, wherein the plurality of sensing units is parallel to each other.

8. The touch panel of claim 1, further comprising a plurality of electrodes located on opposite two ends of the plurality of sensing units and electrically connected with the plurality of sensing units.

9. A multi-points detecting method, comprising steps of:
proving a touch panel comprising a plurality of detecting areas and a plurality of sensing units oriented along a first axial direction in the plurality of detecting areas, wherein the plurality of detecting areas comprises a first detecting area, a second detecting area, and a third detecting area; and the second detecting area is located on a first side of the first detecting area, and the third detecting area is located on a second side opposite to the first side of the first detecting area;
detecting the touch panel along a second axial direction to obtain a detecting curve, wherein a maximum detecting value of the detecting curve is located in the first detecting area, a first average detecting value of the detecting curve of the second detecting area is greater than a second average detecting value of the detecting curve of the third detecting area;
analyzing the first detecting area to obtain a first touch point coordinate;
analyzing the second detecting area to obtain a second touch point coordinate;
analyzing the first touch point coordinate and the second touch point coordinate to obtain a relative distance between the first touch point coordinate and the second touch point coordinate;
defining the touch panel as being touched at the first touch point coordinate or a middle point between the first touch point coordinate and the second touch point coordinate, when the relative distance is less than a predetermined distance; and
defining the touch panel as being touched at the first touch point coordinate and the second touch point coordinate, when the relative distance is greater than or equal to the predetermined distance.

10. The method of claim 9, wherein the plurality of sensing units is a plurality of carbon nanotubes, a plurality of stripe metal films, a plurality of stripe indium tin oxides or a plurality of indium zinc oxides.

11. The method of claim 9, wherein each of the plurality of sensing units has a lower impedance along the first axial direction, and has a higher impedance along the second axial direction perpendicular to the first axial direction.

12. The method of claim 9, wherein two adjacent detecting areas overlap in part.

13. The method of claim 9, wherein the predetermined distance is in a range from about 0.5 centimetres to about 1.5 centimetres.

14. The method of claim 9, wherein the first touch point coordinate and the second touch point coordinate are two-dimensional coordinates.

15. The method of claim 9, wherein the plurality of sensing units is parallel to each other.

16. The method of claim 9, wherein the touch panel further comprises a detecting unit, an analyzing unit, and a defining unit.

17. The method of claim 16, wherein the detecting unit is used for detecting the touch panel along the second axial direction to obtain the detecting curve.

18. The method of claim 16, wherein the analyzing unit is used for analyzing the first detecting area to obtain the first touch point coordinate and analyzing the second detecting area to obtain the second touch point coordinate.

19. The method of claim 9, wherein the touch panel further comprises a plurality of electrodes located on opposite two ends of the plurality of sensing units and electrically connected with the plurality of sensing units.

20. The method of claim 19, wherein two adjacent electrodes and their opposite two adjacent electrodes define each of the plurality of detecting areas.

* * * * *